United States Patent

Guenther et al.

Patent Number: 6,031,064
Date of Patent: Feb. 29, 2000

[54] CONDENSATION PRODUCTS BASED ON TRIAZINES AND FORMALDEHYDE

[75] Inventors: Erhard Guenther, Hassloch; Wolfgang Reuther, Heidelberg, both of Germany

[73] Assignee: BASF Aktiengesellschaft, Ludwigishafen, Germany

[21] Appl. No.: 09/125,546

[22] PCT Filed: Feb. 28, 1997

[86] PCT No.: PCT/EP97/00981

§ 371 Date: Aug. 28, 1998

§ 102(e) Date: Aug. 28, 1998

[87] PCT Pub. No.: WO97/31958

PCT Pub. Date: Sep. 4, 1997

[30] Foreign Application Priority Data

Mar. 1, 1996 [DE] Germany ............ 196 07 978

[51] Int. Cl.[7] .................................. C08G 12/30
[52] U.S. Cl. .............. 528/254; 528/129; 528/163; 528/230; 528/252; 521/49.5
[58] Field of Search .................... 528/129, 163, 528/230, 252, 254; 521/49.5

[56] References Cited

U.S. PATENT DOCUMENTS

| | | |
|---|---|---|
| 3,288,902 | 11/1966 | Schuller et al. . |
| 3,469,219 | 9/1969 | Berg et al. . |
| 4,424,261 | 1/1984 | Keeling et al. . |
| 5,530,031 | 6/1996 | Guenther et al. ............ 521/495 |

FOREIGN PATENT DOCUMENTS 1 452 629 10/1976 United Kingdom .

OTHER PUBLICATIONS

Chem. Abstr. 63 (1965), 7168.

*Primary Examiner*—Duc Truong
*Attorney, Agent, or Firm*—Keil & Weinkauf

[57] ABSTRACT

Condensation products obtained by condensation of
(A) a mixture consisting of
(a) a triazine of the general formula I

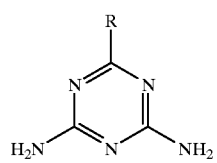

and
(b) a mixture consisting of
(b1) a triazine of the general formula II

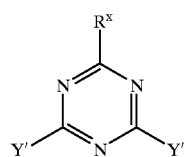

(b2) a substituted melamine of the general formula III

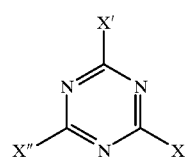

(B) phenols
with
formaldehyde or formaldehyde-donating compounds are useful for producing shaped articles, especially fibers and foams.

5 Claims, No Drawings

CONDENSATION PRODUCTS BASED ON TRIAZINES AND FORMALDEHYDE

The present invention relates to condensation products obtainable by condensation of
(A) from 90 to 100 mol %, based on (A) and (B), of a mixture consisting of
  (a) from 30 to 99.0 mol %, based on (a) and (b), of a triazine of the general formula I

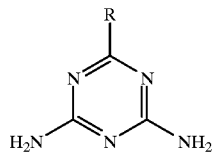

I where R is $C_1$–$C_6$-alkyl, unsubstituted or $C_1$–$C_4$-alkyl-, p-hydroxyphenyl- or o-hydroxyphenyl-monosubstituted, -disubstituted or -trisubstituted phenyl or phenyl-substituted $C_1$–$C_4$-alkyl, or mixtures thereof, and
  (b) from 1 to 70 mol %, based on (a) and (b), of a mixture consisting of
    (b1) from 0 to 100 mol %, based on (b1) and (b2), of a triazine of the general formula II

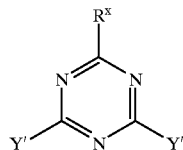

II where $R^x$ is $C_1$–$C_6$-alkyl, unsubstituted or $C_1$–$C_4$-alkyl-monosubstituted, -disubstituted or -trisubstituted phenyl or phenyl-substituted $C_1$–$C_4$-alkyl and Y' is —NHZ, where Z is selected from the group consisting of hydroxy-$C_2$–$C_{10}$-alkyl, hydroxy-$C_2$–$C_4$-alkyl-(oxa-$C_2$–$C_4$-alkyl)$_m$, where m is from 1 to 5, —NHCH$_2$CH$_2$SCH$_2$CH$_2$OH and amino-$C_2$–$C_{12}$-alkyl, or mixtures thereof, and
    (b2)' from 100 to 0 mol %, based on (b1) and (b2), of a substituted melamine of the general formula III

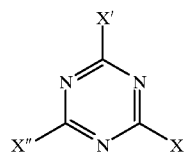

III where X, X' and X" are each selected from the group consisting of —NH$_2$, —NHR' and —NR'R" subject to the proviso that X, X' and X" are not all either —NH$_2$ or —NR'R", where R' and R" are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl, or mixtures thereof,
(B) from 0 to 10 mol %, based on (A) and (B), of phenols which are unsubstituted or are substituted by radicals selected from the group consisting of $C_1$–$C_9$-alkyl and hydroxyl, $C_1$–$C_4$-alkanes substituted by two or three phenol groups, di(hydroxyphenyl)sulfones or mixtures of these phenols, with
  formaldehyde or formaldehyde-donating compounds in a molar ratio of component (A) to formaldehyde within the range from 1:1.15 to 1:4.5.

This invention further relates to a process for preparing these condensation products, to their use for producing shaped articles, especially fibers, and to shaped articles, especially fibers, obtainable from the use.

Condensation resins based on acetoguanamine and formaldehyde are known from U.S. Pat. No. 3,469,219, for example. Furthermore, U.S. Pat. No. 2,809,951 discloses condensation resins based on benzoguanamine and formaldehyde.

Furthermore, condensation resins are known which, in addition to the aforementioned starting materials, include melamine (Kobunshi Kagaku 22 (238) 113–117, 1965; CA 63 (1965) 7168c), phenol or urea (NL-A 6,414,076) for modification. These condensation resins have heretofore been used in the areas of laminate production, the gluing of cellulose, the production of pressing compounds and the production of coating resins. Known condensation resins based on acetoguanamine or benzoguanamine have the disadvantage of an insufficient viscosity and an insufficient solids content for fibermaking. The insufficient solids content means that a lot of water has to be removed in spinning, which leads to poor fiber formation and coalesced fibers.

EP-A-523 485 describes condensation products obtainable by condensation of a mixture containing as essential components
  (AA) from 90 to 99.9 mol % of a mixture consisting essentially of
    (Aa) from 30 to 99 mol % of melamine and
    (Ab) from 1 to 70 mol % of a substituted melamine of the general formula I'

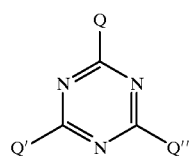

I' where Q, Q' and Q" are each selected from the group consisting of —NH$_2$, —NHR* and —NR*R** subject to the proviso that Q, Q' and Q" are not all —NH$_2$, where R* and R** are each selected from the group consisting of hydroxy-$C_2$–$C_4$-alkyl, hydroxy-$C_2$–$C_4$-alkyl- (oxa-$C_2$–$C_4$-alkyl)$_n$, where n is from 1 to 5, and amino-$C_2$–$C_{12}$-alkyl, or mixtures of melamines I', and
  (AB) from 0.1 to 10 mol %, based on (AA) and (AB), of phenols which are unsubstituted or substituted by radicals selected from the group consisting of $C_1$–$C_9$-alkyl and hydroxyl, $C_1$–$C_4$-alkanes substituted by two or three phenol groups, di(hydroxyphenyl)sulfones or mixtures of these phenols, with
  formaldehyde or formaldehyde-donating compounds in a molar ratio of melamines to formaldehyde within the range from 1:1.15 to 1:4.5 and their use for producing fibers and foams and shaped articles obtainable from these products.

Fibers produced by the process of EP-A 523 485 have the disadvantage that their tenacity and breaking extension are insufficient for some applications.

It is an object of the present invention to provide acetoguanamine- and benzoguanamine-based fibers having improved tenacity and breaking extension.

We have found that this object is achieved by the condensation products defined at the beginning. The present invention further provides a process for preparing these condensation products, their use for producing shaped articles, especially fibers, and shaped articles, especially fibers, obtainable from the use.

The condensation products of this invention include as monomeric building block (A) from 90 to 100, preferably from 95 to 99, mol %, based on (A) and (B), of a mixture consisting of (a) from 30 to 99.0, preferably from 60 to 95, particularly preferably from 75 to 90, mol %, based on (a) and (b), of a triazine of the general formula I or mixtures thereof, and (b) from 1 to 70, preferably from 5 to 40, particularly preferably from 10 to 25, mol %, based on (a) and (b), of a mixture consisting of (b1) from 0 to 100, preferably from 30 to 70, particularly preferably from 40 to 65, mol %, based on (b1) and (b2), of a triazine of the general formula II or mixtures thereof, and (b2) from 100 to 0, preferably from 70 to 30, particularly preferably from 60 to 35, mol %, based on (b1) and (b2), of a substituted melamine of the general formula III or mixtures thereof.

As further monomeric building block (B) the condensation resins of this invention may include from 0 to 10, preferably from 0.01 to 5, particularly preferably from 0.1 to 3, mol %, based on the total number of moles of monomeric building blocks (A) and (B), of a phenol or of a mixture of phenols.

The condensation resins of this invention are obtainable by reacting component (A) and, if present, component (B) with formaldehyde or formaldehyde-donating compounds in a molar ratio of component (A) to formaldehyde within the range from 1:1.15 to 1:4.5, preferably 1:2.0 to 1:1.35.

Suitable triazines of the general formula I

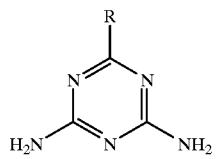

I are those in which R is $C_1$–$C_6$-alkyl, unsubstituted or $C_1$–$C_4$-alkyl-, p-hydroxyphenyl- or o-hydroxyphenyl-monosubstituted, -disubstituted or -trisubstituted phenyl or phenyl-substituted $C_1$–$C_4$-alkyl, especially phenyl. $C_1$–$C_6$-alkyl is preferably methyl, ethyl, n-propyl, isopropyl, n-butyl, isobutyl, sec-butyl, tert-butyl, n-pentyl or n-hexyl, particularly preferably methyl.

Triazines of the general formula I which are particularly suitable for the invention are 2,4-diamino-6-methyl-1,3,5-triazine (acetoguanamine) and 2,4-diamino-6-phenyl-1,3,5-triazine (benzoguanamine).

Triazines of the general formula I are commercially available.

Suitable triazines of the general formula II

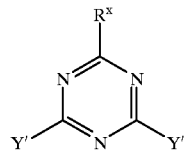

II are those in which $R^x$ is $C_1$–$C_6$-alkyl, unsubstituted or $C_1$–$C_4$-alkyl-monosubstituted, -disubstituted or -trisubstituted phenyl or phenyl-substituted $C_1$–$C_4$-alkyl, especially phenyl, and Y' is —NHZ, where Z is selected from the group consisting of hydroxy-$C_2$–$C_{10}$-alkyl, hydroxy-$C_2$–$C_4$-alkyl- (oxa-$C_2$–$C_4$-alkyl)$_m$, where m is from 1 to 5, —NHCH$_2$CH$_2$SCH$_2$CH$_2$OH and amino-$C_2$–$C_{12}$-alkyl.

$C_1$–$C_6$-alkyl is preferably methyl, ethyl, n-, isopropyl, n-, i-, sec-, tert-butyl, n-pentyl and n-hexyl, particularly preferably methyl.

Preferred hydroxy-$C_2$–$C_{10}$-alkyl includes hydroxy-$C_2$–$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$–$C_4$-alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

Preferred hydroxy-$C_2$–$C_4$-alkyl (oxa-$C_2$–$C_4$-alkyl) groups are those with m=from 1 to 4, particularly preferably those with m=1 or 2, such as 5-hydroxy-3-oxapentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, 8-hydroxy-3,6-dioxaoctyl.

Amino-$C_2$–$C_{12}$-alkyl is preferably amino-$C_2$–$C_8$-alkyl such as 2-aminoethyl, 3-amino-n- and -i-propyl, 4-aminobutyl, 5-aminopentyl, 6-aminohexyl, 7-aminoheptyl and 8-aminooctyl, particularly preferably 2-aminoethyl and 6-aminohexyl, very particularly preferably 6-aminohexyl.

The following compounds are triazines of the general formula II particularly suitable for this invention:

2,4-di(5-hydroxy-3-oxapentylamino)-6-methyl-1,3,5-triazine, 2,4-dihydroxyethylamino)-6-methyl-1,3,5-triazine, 2,4-di(5-hydroxy-3-oxapentylamino)-6-phenyl-1,3,5-triazine, and 2,4-dihydroxyethylamino)-6-phenyl-1,3,5-triazine.

The substituted triazines II are obtainable by amine exchange of the corresponding 6-substituted 2,4-diamino-1,3,5-triazines with the corresponding amines H$_2$NZ (see for example U.S. Pat. No. 4,424,261, which describes a process for preparing triazines of the type II). Customarily, the amine exchange is carried out at temperatures within the range from 100 to 220° C., preferably from 120 to 200° C., advantageously at atmospheric pressure.

The reaction can be carried out in the presence of solvents such as polyols of the formula HO—(CHR$^{xx}$—CH$_2$O—)$_p$—H$_2$—CHR$^{xx}$—OH where p is 0, 1, 2 or 3 and R$^{xx}$ is H or Me, preferably in ethylene glycol, 1,2-propylene glycol, diethylene glycol and also in excess amine.

The molar ratio of amine, H$_2$NZ, to triazine is customarily chosen within the range from 3:1 to 10:1, preferably from 4:1 to 6:1. Particular preference is given to a procedure where the amine is used in excess, so that the further addition of solvent can be dispensed with.

In a preferred embodiment, the amine exchange is carried out in the presence of a catalyst which can be selected from the group consisting of protic acids such as phosphoric acid, phosphorous acid, hypophosphorous acid, sulfuric acid, hydrochloric acid, nitric acid, hydrofluoric acid, hydrobromic acid, sulfamic acid, thiocyanic acid, p-toluenesulfonic acid or methanesulfonic acid and ammonium salts thereof and Lewis acids such as boron trifluoride, aluminum trichloride, tin tetrachloride, antimony pentafluoride or iron (III) bromide.

Preferred catalysts are phosphoric acid, phosphorous acid, hypophosphorous acid, hydrochloric acid and sulfuric acid and also ammonium salts thereof and also combinations of the acids mentioned. The amount of catalyst used per mole of triazine is preferably from 0.05 to 3 mol, particularly preferably from 0.1 to 1 mol.

However, from observations to date, the presence of a catalyst is not absolutely necessary.

The course of the reaction is advantageously monitored using analytical methods, a preferred possibility being HPLC.

If the amine exchange is carried out in the presence of one of the aforementioned catalysts, the triazines II are generally isolated by neutralizing with a customary base such as an alkali metal hydroxide, in particular sodium hydroxide or potassium hydroxide, and then separating off the precipitated salts.

Excess amine can be distilled off at reduced pressure (preferably from 10 to 100, particularly preferably from 10 to 20, mbar) at a temperature within the range from 100 to 250° C., preferably from 150 to 200° C., depending on the boiling point of the amine used.

Suitable substituted melamines of the general formula III

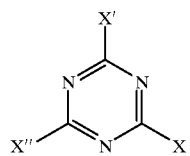

III are those in which X, X' and X" are each selected from the group consisting of —$NH_2$, —NHR' and —NR'R" subject to the proviso that X, X' and X" are not all either —$NH_2$ or —NR'R", where R' and R" are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl.

Preferred hydroxy-$C_2$–$C_{10}$-alkyl includes hydroxy-$C_2$–$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$–$C_4$-alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

Preferred hydroxy-$C_2$–$C_4$-alkyl (oxa-$C_2$–$C_4$-alkyl)$_n$ groups are those with n=from 1 to 4, particularly preferably those with n=1 or 2, such as 5-hydroxy-3-oxapentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, 8-hydroxy-3,6-dioxaoctyl.

Amino-$C_2$–$C_{12}$-alkyl is preferably amino-$C_2$–$C_8$-alkyl such as 2-aminoethyl, 3-aminopropyl, 4-aminobutyl, 5-aminopentyl, 6-aminohexyl, 7-aminoheptyl and 8-aminooctyl, particularly preferably 2-aminoethyl and 6-aminohexyl, very particularly preferably 6-aminohexyl.

The following compounds are substituted melamines III particularly suitable for this invention:
2-hydroxyethylamino-substituted melamines such as 2-(2-hydroxyethylamino)-4,6-diamino-1,3,5-triazine, 2,4-di(2-hydroxyethylamino)-6-amino-1,3,5-triazine, 2,4,6-tris(2-hydroxyethylamino)-1,3,5-triazine,
2-hydroxyisopropylamino-substituted melamines such as 2-(2-hydroxyisopropylamino)-4,6-diamino-1,3,5-triazine, 2,4-di(2-hydroxyisopropylamino)-6-amino-1,3,5-triazine, 2,4,6-tris(2-hydroxyisopropylamino)-1,3,5-triazine,
5-hydroxy-3-oxapentylamino-substituted melamines such as 2-(5-hydroxy-3-oxapentylamino)-4,6-diamino-1,3,5-triazine, 2,4-di(5-hydroxy-3-oxapentylamino)-6-amino-1,3,5-triazine, 2,4,6-tris(5-hydroxy-3-oxapentylamino)-1,3,5-triazine, 6-aminohexylamino-substituted melamines such as 2-(6-aminohexylamino)-4,6-diamino-1,3,5-triazine, 2,4-di(6-aminohexylamino)-6-amino-1,3,5-triazine, 2,4,6-tris(6-aminohexylamino)-1,3,5-triazine or mixtures of these compounds, for example a mixture of 10 mol % of 2-(5-hydroxy-3-oxapentylamino)-4,6-diamino-1,3,5-triazine, 50 mol % of 2,4-di(5-hydi-oxy-3-oxapentylamino)-6-amino-1,3,5-triazine and 40 mol % of 2,4,6-tris(5-hydroxy-3-oxapentylamino)-1,3,5-triazine.

Processes for preparing the substituted melamines III are described for example in EP-A 225,433 and DE-A 4,331,233.

Suitable phenols (B) include phenols containing one or two hydroxyl groups, such as unsubstituted phenols, phenols substituted by radicals selected from the group consisting of $C_1$–$C_9$-alkyl and hydroxyl, and also $C_1$–$C_4$-alkanes substituted by two or three phenol groups, di(hydroxyphenyl) sulfones, and mixtures thereof.

Preferred phenols include phenol, 4-methylphenol, 4-tert-butylphenol, 4-n-octylphenol, 4-n-nonylphenol, pyrocatechol, resorcinol, hydroquinone, 2,2-bis(4-hydroxyphenyl)propane, 4,4'-dihydroxydiphenyl sulfone, particularly preferably phenol, resorcinol and 2,2-bis(4-hydroxyphenyl)propane.

Formaldehyde is generally used as an aqueous solution having a concentration of, for example, from 40 to 50% by weight or in the form of compounds that supply formaldehyde in the course of the reaction with (A) and (B), for example as oligomeric or polymeric formaldehyde in solid form, such as paraformaldehyde, 1,3,5-trioxane or 1,3,5,7-tetroxocane.

The condensation resins are prepared by polycondensing component (A) and, if desired, component (B) together with formaldehyde or formaldehyde-donating compounds, either having all the components (A(a), A(b1), A(b2), B) present from the start or adding them portionwise and gradually to the reaction and subsequently adding a further triazine I, triazine II, substituted melamine III or a phenol to the precondensates formed.

The polycondensation is typically carried out in a conventional manner (see EP-A 355 760 or Houben-weyl, Vol. 14/2, p. 357).

The reaction temperatures used are generally chosen within the range from 20 to 150° C., preferably from 40 to 140° C.

The reaction pressure is at present not considered critical. In general, the pressure employed is within the range from 70 to 500 kPa, preferably from 90 to 150 kPa, particularly preferably atmospheric pressure.

The reaction can be carried out with or without solvent. Typically, no solvent is added when aqueous formaldehyde solution is used. If formaldehyde bound in solid form is used, water is usually used as solvent, and the amount used is typically within the range from 5 to 40, preferably from 15 to 25% by weight, based on the total amount of monomer used.

The pH during the polycondensation reaction depends essentially on the components used. If acetoguanamine or its derivatives are used as component A(a), it is preferable to use a pH of from 4 to 10, particularly preferably from 5 to 7. If benzoguanamine or its derivatives are used as component A(a), it is preferable to use a pH of from 7 to 10, particularly preferably from 8 to 9.5.

The pH is customarily set by adding a base, preferably an alkali metal hydroxide such as sodium hydroxide or potassium hydroxide, particularly preferably sodium hydroxide or potassium hydroxide, at the start of the condensation. It is also possible to use a tertiary amine, preferably diethylethanolamine, as buffer.

As fillers it is possible to use for example fibrous or pulverulent inorganic reinforcing agents or fillers such as glass fibers, metal powders, metal salts or silicates, for example kaolin, talc, baryte, quartz or chalk, also pigments, for example carbon black, and dyes. Emulsifiers used are generally the customary nonionic, anionic or cationic organic compounds having long-chain alkyl radicals. If the uncured resins are to be processed into foams, it is possible to use pentane, for example, as blowing agent.

The polycondensation can be carried out batchwise or continuously, for example in an extruder (see EP-A 355 760), in a conventional manner.

The condensation products of this invention are preferably used to produce shaped articles, especially foams and fibers.

The production of shaped articles by curing the condensation products of this invention is effected in a conventional manner by adding small amounts of acids such as formic acid, sulfuric acid or ammonium chloride.

Foams can be produced by foaming an aqueous solution or dispersion which contains the uncured condensate, an emulsifier, a blowing agent and a curing agent, optionally with customary additives, as listed above, and then curing the foam. Such a process is described in detail in DE-A 29 15 457.

Fibers are generally produced by spinning the melamine resin of the invention in a conventional manner, for example following addition of a curing agent, at room temperature, in a rotospinning apparatus and subsequently curing the crude fibers in a heated atmosphere, or by spinning in a heated atmosphere, simultaneously evaporating the water used as solvent and curing the condensate. Such a process is described in detail in DE-A 23 64 091.

In a preferred embodiment, the condensation products of this invention are prepared with a solids content of not less than 60% by weight.

The advantages of the condensation products of this invention are that they can be processed into fibers possessing high tenacity and breaking extension.

EXAMPLES

Example 1
Condensation resin of triazine I+triazine II+formaldehyde

A mixture of 1871.1 g of acetoguanamine, 496.7 g (1.65 mol) of 2,4-di(5-hydroxy-3-oxapentylamine)-6-methyl-1,3,5-triazine, 636.1 g (21.2 mol) of paraformaldehyde, 1784.6 g (23.8 mol) of 40% strength by weight aqueous formaldehyde solution was heated to 98° C. over 15 min while a pH of 6.0 was set by adding 25% strength by weight aqueous potassium hydroxide solution. The mixture was stirred at 98° C. for 175 min, until a viscosity of 450 Pas (24° C.) had been reached. The mixture was then rapidly cooled down to room temperature with ice cooling. Solids content: theoretical: 77.6% by weight; actual: 74.8% by weight.

Example 2
Condensation resin of triazine I+triazine III+formaldehyde

A mixture of 1126.3 g (9 mol) of acetoguanamine, 411.3 g (1 mol) of an 80% strength by weight mixture of 2-(5-hydroxy-3-oxapentylamino)-4,6-diamino-1,3,5-triazine, 2,4-di(5-hydroxy-3-oxapentylamino)-6-amino-1,3,5-triazine, 2,4,6-tri(5-hydroxy-3-oxapentylamino)-1,3,5-triazine in the ratio in the stated order of 10:50:40 mol % ("HOM"), 558.5 g (18.6 mol) of paraformaldehyde, 835.7 g (11.4 mol) of 40% strength by weight aqueous formaldehyde solution was heated to 98° C. over 15 min while a pH of 6.0 was set by adding 1.63 g of 25% strength by weight aqueous formic acid. The mixture was stirred at 98° C. for 120 min, until a viscosity of 231 Pas (24° C.) had been reached. The mixture was then rapidly cooled down to room temperature with ice-cooling. Solids content: theoretical: 82.4% by weight; actual: 79.5% by weight.

Example 3
Condensation resin of triazine I+triazine II+triazine III+formaldehyde A mixture of 1126.3 g (9 mol) of acetoguanamine, 451.5 g (1.5 mol) of 2,5-di(5-hydroxy-3-oxapentylamine)-6-methyl-1,3,5-triazine, 411.3 g (1 mol) of an 80% strength by weight mixture of 2-(5-hydroxy-3-oxapentylamino)-4,6-diamino-1,3,5-triazine, 2,4-di(5-hydroxy-3-oxapentylamino)-6-amino-1,3,5-triazine, 2,4,6-tri(5-hydroxy-3-oxapentylamino)-1,3,5-triazine in the ratio in the stated order of 10:50:40 mol %, 641.7 g (21.39 mol) of paraformaldehyde, 961.1 g (13.1 mol) of 40% strength by weight aqueous formaldehyde solution was heated to 98° C. over 15 min while a pH of 6.0 was set by adding 3.2 g of 25% strength by weight aqueous formic acid. The mixture was stirred at 98° C. for 132 min, until a viscosity of 357 Pas (24° C.) had been reached. The mixture was then rapidly cooled down to room temperature with ice-cooling. Solids content: theoretical: 83.6% by weight; actual: 80.1% by weight.

Example 4
Condensation resin of triazine I+triazine III+formaldehyde+phenol

A mixture of 1126.3 g (9 mol) of acetoguanamine, 411.3 g (1 mol) of an 80% strength by weight mixture of 2-(5-hydroxy-3-oxapentylamino)-4,6-diamino-1,3,5-triazine, 2,4-di(5-hydroxy-3-oxapentylamino)-6-amino-1,3,5-triazine, 2,4,6-tri(5-hydroxy-3-oxapentylamino)-1,3,5-triazine in the ratio in the stated order of 10:50:40 mol %, 558.5 g (18.6 mol) of paraformaldehyde, 835.7 g (11.4 mol) of 40% strength by weight aqueous formaldehyde solution and 22.8 g of bisphenol A (2,2-bis(4-hydroxyphenyl) propane) was heated to 98° C. over 15 min while a pH of 6.0 was set by adding 1.33 g of 25% strength by weight aqueous formic acid. The mixture was stirred at 98° C. for 120 min, until a viscosity of 251 Pas (24° C.) had been reached. The mixture was then rapidly cooled down to room temperature with ice-cooling. Solids content: theoretical: 82.5% by weight; actual: 79.3% by weight.

Example 5
Production of a fiber

The condensation resin from Example 1 was admixed with 25% strength by weight formic acid (proportion of formic acid solution in the resulting mixture: 3% by weight), stirred until homogeneous, fed into a centrifugal spinning apparatus and spun similarly to the process described in EP-A 523 485 to form fibers.

Fiber diameter: 5–15 μm

AATCC formaldehyde emission: 405 ppm*)

Weight loss by hydrolysis (24 h, 100° C.): 1.9%

Tenacity: 476 N/mm² (Fafegraph from Textechno)

Breaking extension: 29.6% (Fafegraph from Textechno)

*) The formaldehyde emission was determined according to the test method 112–1978 of the American Association of Textile Chemists and Colorists (AATCC) as described in EP-A 523 485.

Comparative Example

A mixture of 1871 g of melamine, 620 g of an 80% strength by weight HOM mixture (see Example 2), 472.8 g of paraformaldehyde, 38.2 g of phenol and 15.4 ml of diethylethanolamine was condensed at 98° C. for 150 min to a viscosity of 500 Pas. Following addition of 1% strength by weight formic acid, the resin was spun in a conventional manner (see Example 2) into fiber.

AATCC: 253 ppm tenacity: 427 N/mm²

Breaking extension: 21%

The tenacity and the breaking extension were determined by the method of PM-T 4001- 82.

The theoretical solids content is calculated from the components used minus the water content. The actual solids content was determined by measuring the nonvolatiles after heating at 120° C. for 2 hours.

We claim:

1. A condensate consisting essentially of the condensation product of the following monomers
    (A) from 90 to 100 mol %, based on (A) and (B), of a mixture consisting essentially of
        (a) from 30 to 99.0 mol %, based on (a) and (b), of a triazine of the general formula I

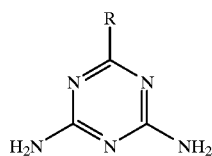

I where R is $C_1$–$C_6$-alkyl, unsubstituted or $C_1$–$C_4$-alkyl-, p-hydroxyphenyl- or o-hydroxyphenyl-monosubstituted, -disubstituted or -trisubstituted phenyl or phenyl-substituted $C_1$–$C_4$-alkyl, or mixtures thereof,
and
        (b) from 1 to 70 mol %, based on (a) and (b), of a mixture consisting essentially of
            (b1) from 0 to 100 mol %, based on (b1) and (b2), of a triazine of the general formula II

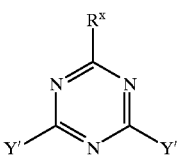

II where $R^x$ is $C_1$–$C_6$-alkyl, unsubstituted or $C_1$–$C_4$-alkyl-monosubstituted, -disubstituted or -trisubstituted phenyl or phenyl-substituted $C_1$–$C_4$-alkyl and Y' is —NHZ, where Z is selected from the group consisting of hydroxy-$C_2$–$C_{10}$-alkyl, hydroxy-$C_2$–$C_4$-alkyl-(oxa-$C_2$–$C_4$-alkyl)$_m$, where m is from 1 to 5,
—NHCH$_2$CH$_2$SCH$_2$CH$_2$OH and amino-$C_2$–$C_{12}$-alkyl, or mixtures thereof,
and
            (b2) from 100 to 0 mol %, based on (b1) and (b2), of a substituted melamine of the general formula III

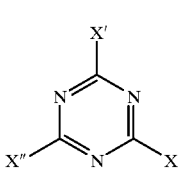

III where X, X' and X" are each selected from the group consisting of —NH$_2$, —NHR' and —NR'R" subject to the proviso that X, X' and X" are not all either —NH$_2$ or —NR'R", where R' and R" are each selected from the group consisting of hydroxy-$C_2$–$C_{10}$-alkyl, hydroxy-$C_2$–$C_4$-alkyl- (oxa-$C_2$–$C_4$-alkyl)$_n$, where n is from 1 to 5, and amino-$C_2$–$C_{12}$-alkyl, or mixtures thereof,
    (B) from 0 to 10 mol %, based on (A) and (B), of phenols which are unsubstituted or are substituted by radicals selected from the group consisting of $C_1$–$C_9$-alkyl and hydroxyl, $C_1$–$C_4$-alkanes substituted by two or three phenol groups, di(hydroxyphenyl)sulfones or mixtures of these phenols,
with
    formaldehyde or formaldehyde-donating compounds in a molar ratio of component (A) to formaldehyde within the range from 1:1.15 to 1:4.5.

2. Condensation products as claimed in claim 1 with a solids content of not less than 60% by weight.

3. A condensate of a triazine derivative with formaldehyde consisting essentially of the condensation product of the following monomers
    (A) from 90 to 100 mol %, based on (A) and (B), of a mixture consisting essentially of
        (a) from 30 to 99.0 mol %, based on (a) and (b), of a triazine of the general formula I

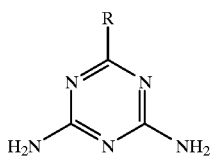

where R is $C_1$–$C_6$-alkyl, unsubstituted or $C_1$–$C_4$-alkyl-, p-hydroxyphenyl- or o-hydroxyphenyl-monosubstituted, -disubstituted or -trisubstituted phenyl or phenyl-substituted $C_1$–$C_4$-alkyl, or mixtures thereof,
and
(b) from 1 to 70 mol %, based on (a) and (b), of a mixture consisting of
(b1) from 0 to 100 mol %, based on (b1) and (b2), of a triazine of the general formula II

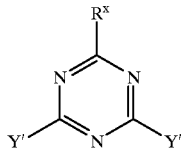

where $R^x$ is $C_1$–$C_6$-alkyl, unsubstituted or $C_1$–$C_4$-alkyl-monosubstituted, -disubstituted or -trisubstituted phenyl or phenyl-substituted $C_1$–$C_4$-alkyl and Y' is —NHZ, where Z is selected from the group consisting of hydroxy-$C_2$–$C_{10}$-alkyl, hydroxy-$C_2$–$C_4$-alkyl-(oxa-$C_2$–$C_4$-alkyl)$_m$, where m is from 1 to 5, —NHCH$_2$CH$_2$SCH$_2$CH$_2$OH and amino-$C_2$–$C_{12}$-alkyl, or mixtures thereof, and
(b2) from 100 to 0 mol %, based on (b1) and (b2), of a substituted melamine of the general formula III

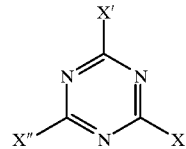

where X, X' and X" are each selected from the group consisting of —NH$_2$, —NHR' and —NR'R" subject to the proviso that X, X' and X" are not all either —NH$_2$ or —NR'R", where R' and R" are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl, or mixtures thereof,
(B) from 0 to 10 mol %, based on (A) and (B), of phenols which are unsubstituted or are substituted by radicals selected from the group consisting of $C_1$–$C_9$-alkyl and hydroxyl, $C_1$–$C_4$-alkanes substituted by two or three phenol groups, di(hydroxyphenyl)sulfones or mixtures of these phenols,
with
formaldehyde or formaldehyde-donating compounds in a molar ratio of component (A) to formaldehyde within the range from 1:1.15 to 1:4.5.

4. A shaped article prepared from the condensate of claims 1 or 3.

5. A fiber prepared from the condensate of claims 1 or 3.

* * * * *